United States Patent
Shimizu

(10) Patent No.: US 7,660,769 B2
(45) Date of Patent: Feb. 9, 2010

(54) SYSTEM AND METHOD FOR DIGITAL CONTENT PLAYER WITH SECURE PROCESSING VAULT

(75) Inventor: Kanna Shimizu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 11/530,940

(22) Filed: Sep. 12, 2006

(65) Prior Publication Data

US 2008/0065547 A1 Mar. 13, 2008

(51) Int. Cl.
*G06F 17/60* (2006.01)
(52) U.S. Cl. .............................. 705/50; 705/51; 705/57
(58) Field of Classification Search .................. 705/50, 705/51, 57
See application file for complete search history.

(56) References Cited

U.S. PATENT DOCUMENTS

| | | | | |
|---|---|---|---|---|
| 5,982,891 | A | 11/1999 | Ginter et al. ................... | 705/54 |
| 6,732,275 | B1 * | 5/2004 | Dimenstein ................. | 713/193 |
| 6,988,205 | B2 * | 1/2006 | Walker et al. ............... | 713/193 |
| 7,519,836 | B2 * | 4/2009 | Walker et al. ............... | 713/194 |
| 2005/0265554 | A1 * | 12/2005 | Walker et al. ............... | 380/283 |
| 2006/0015748 | A1 | 1/2006 | Goto et al. ................... | 713/190 |
| 2008/0065547 | A1 * | 3/2008 | Shimizu ....................... | 705/51 |

FOREIGN PATENT DOCUMENTS

EP 1 126 356 A 8/2001

JP 2002229447 A * 8/2002

OTHER PUBLICATIONS

PCT International Search Report, mailed Feb. 29, 2008, for PCT application EP2007/059124, 8 pages.
Shimuzu, "The Cell Broadband Engine Processor Security Architecture," Apr. 24, 2006, published by IBM Developerworks, http://www-128.ibm.com/developerworks/power/library/pa-cellsecurity/>.
Srinivasan et al., "Cell Broadband Engine processor DMA engines, Part 2: From an SPE point of view," May 2, 2006, published by IBM Developerworks, http://www.ibm.com/developerworks/power/library/pa-celldmas2/index.html.
U.S. Appl. No. 11/345,848, filed Feb. 2, 2006, H. Peter Hofstee.

* cited by examiner

*Primary Examiner*—Pierre E Elisca
(74) *Attorney, Agent, or Firm*—VanLeeuwen & VanLeeuwen; Matthew B. Talpis

(57) ABSTRACT

A system and method for digital content player with secure processing vault is presented. A system uses an attached processing unit and a local storage area as a hardware-based secure processing vault. The secure processing vault calculates a title key based upon stored device keys, and decrypts encrypted/encoded digital content using the calculated title key. The decryption process results in encoded digital content, which remains within the secure processing vault until the secure processing vault decodes the encoded digital content. The decoded digital content is then passed to a main processing unit or a graphics card for further processing. In one embodiment, a secure processing vault may process multiple threads in parallel. In another embodiment, multiple secure processing vaults may be used to process a single, highly computational thread.

32 Claims, 7 Drawing Sheets

SYSTEM AND METHOD FOR DIGITAL CONTENT PLAYER WITH SECURE PROCESSING VAULT

BACKGROUND OF THE INVENTION

1. Technical Field

The present invention relates to a system and method for digital content player with secure processing vault. More particularly, the present invention relates to a system and method for decrypting and decoding encrypted/encoded digital content within a hardware-based secure environment.

2. Description of the Related Art

As high-definition entertainment content becomes widely available, digital content owners are increasingly concerned with piracy. Although the digital content owners wish to expand into new distribution channels, such as the Internet, the digital content owners are understandably concerned with losing distribution control and, as a result, losing revenue.

Many protocol and software-level content protection technologies exist that facilitate seller-to-buyer digital content transfer. A challenge found with these technologies, however, is that they do not take into account platform system security. Even with copy protection technologies in place, digital content may be "stolen" in an unsecured system platform.

System security has traditionally been based upon an operating system correctly granting access. Thus, from a theoretical perspective, the operating system should prevent a malicious client's attempts to access the digital content. In practice, however, malicious clients have found means to circumvent this protection scheme and gain access to digital content. For example, a malicious client may use buffer overflow to gain operating system control and, therefore, access the digital content. As a result of this lack of system security, digital content owners are concerned with a system's ability to control digital content distribution.

Existing art attempts to solve a system's lack of security by using virtualization technology, which places a "digital content player" within a separate partition. A challenge found with this approach, however, is that the digital content player is still vulnerable to software-based attacks because the separate partitioning relies upon the corresponding hypervisor code's integrity.

Typically, digital content is first encoded (or compressed) and then encrypted, which is the primary control point for content protection against piracy. To play back the content, it must be decrypted first and then decoded. One approach to recover the digital content from its encrypted/encoded format is to decrypt the digital content within a secure environment and decode the digital content within a non-secure environment. A challenge with this approach, however, is that the most valuable form of the digital content, which is decrypted but still encoded, resides in a non-secure environment and available to malicious clients.

What is needed, therefore, is a system and method for decrypting and decoding encrypted/encoded digital content within a hardware-based secure environment.

SUMMARY

It has been discovered that the aforementioned challenges are resolved using a system and method for using a hardware-based secure processing vault to both decrypt and decode encrypted/encoded digital content. As a result, decrypted, yet still encoded, digital content exists within the secure processing vault and never resides in a non-secure area, such as main memory.

A system includes a main processing unit (MPU), and one or more attached processing complexes (APCs). The MPU executes application programs, and sends program thread requests to one or more of the APCs to process based upon workload. For example, the MPU may be executing a video application, and request an APC to process a thread corresponding to encrypted/encoded digital video.

Each APC includes a bus interface unit, an attached processing unit (APU), and a local storage area. The APU is a processing core, which may be a different core type than the MPU. For example, the MPU may be a controller-based core for executing an application, and the APU may be a digital signal processing-based core that is better suited for signal processing tasks. The local storage area may be stored on a nonvolatile or volatile storage area, such as computer memory.

When the MPU requests the APC to process a thread, the thread request passes through a bus interface unit to the APU. The APU identifies the thread, and locks a secure processing vault (SPV). The SPV includes the APU and the local storage area, and is inaccessible to external sources when locked, such as a malicious client. The secure processing vault provides an isolated and authenticated environment for decrypting and decoding encrypted/encoded digital content. Since the secure processing vault's security is guaranteed by hardware as opposed to software, malicious clients are much less likely to tamper with and compromise the system.

The APU authenticates the received program thread, and calculates a title key based upon particular device keys. In turn, the APU in conjunction with the local storage area decrypt (using the title key) and decode encrypted/encoded digital content. During the decryption and decoding stages, the APU uses physical addresses to access the local storage area (not translated addresses) so that the SPV is not compromised when a malicious client attempts to alter address translation tables. When the APU finishes decrypting and decoding the encrypted/encoded digital content, the APU provides the decrypted and decoded digital content back to the MPU or a graphics card for further processing.

In one embodiment, the MPU may request an APC to process multiple program threads. In this embodiment, the APC's APU locks its secure processing vault and processes each thread in parallel. In another embodiment, the MPU may request multiple APC's to process a single, computationally intensive thread. In this embodiment, each APC's secure processing vault partially decodes the encrypted/encoded digital content, and encrypts the partially decoded digital content before sending it to another APC.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
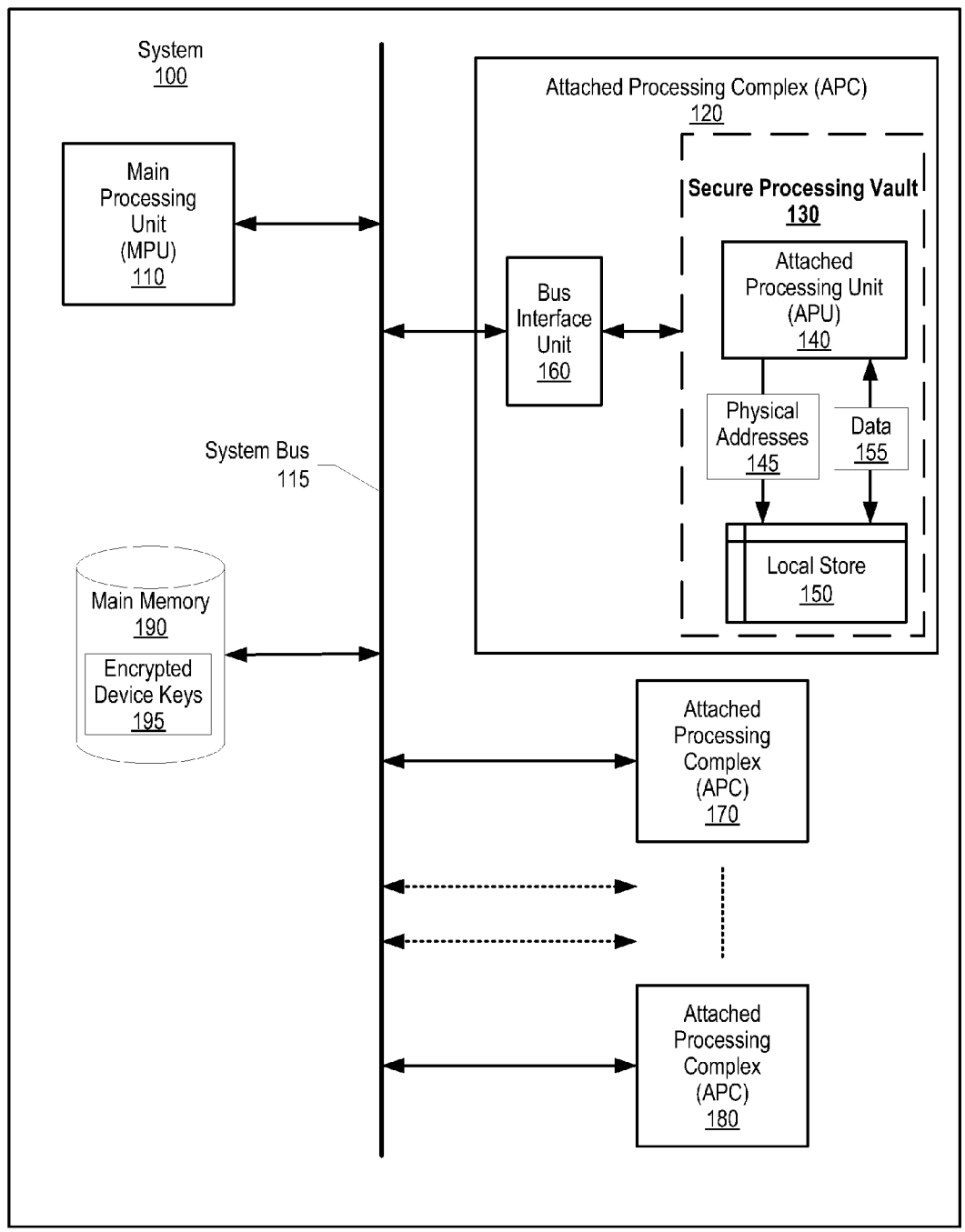
FIG. 1 is a diagram showing a system that includes secure processing vaults for decrypting and decoding encrypted/encoded digital content within a secure environment.

FIG. 1 is a diagram showing a system that includes secure processing vaults for decrypting and decoding encrypted/encoded digital content within a secure environment. System 100 includes main processing unit (MPU) 110, and attached processing complexes (APCs) 120, 170, and 180. MPU 110 executes application programs, and sends program thread requests to one or more of the APCs to process based upon workload. For example, MPU 110 may be executing a video application, and request APC 120 to process a thread corresponding to encrypted/encoded digital video.

Each APC includes a bus interface unit, an attached processing unit, and a local storage area. As can be seen in FIG. 1, APC 120 includes bus interface unit 160, attached processing unit 140, and local storage area 150. Bus interface unit 160 provides data and control signals between APC 120 and system bus 115. Attached processing unit 140 is a processing core, which may be a different core type than MPU 110. For example, MPU 110 may be a controller-based core for executing an application, and APU 140 may be a digital signal processing-based core that is better suited for signal processing tasks. Local store 150 is an isolated local storage area and may be stored on a nonvolatile or volatile storage area, such as computer memory.

When MPU 110 requests APC 120 to process a thread, the thread request passes through bus interface unit 160 to APU 140. APU 140 identifies the thread, and locks secure processing vault (SPV) 130. SPV 130 includes APU 140 and local store 150, and is inaccessible to external sources when locked, such as a malicious client. The secure processing vault provides an isolated and authenticated environment for decrypting and decoding encrypted/encoded digital content. Since the secure processing vault's security is guaranteed by hardware as opposed to software, malicious clients are much less likely to tamper and compromise system 100.

APU 140 authenticates the received program thread, and retrieves encrypted device keys 195 from main memory 190. In turn, APU 140 decrypts encrypted device keys 195 and calculates a title key based upon the decrypted device keys. As such, APU 140 in conjunction with local store 150 decrypt (using the title key) and decode encrypted/encoded digital content. During the decryption and decoding stages, APU 140 uses physical addresses 145 to access local store 150 (not translated addresses) so that secure processing vault 130 is not compromised when a malicious client attempts to alter address translation tables. When APU 140 finishes decrypting and decoding the encrypted/encoded digital content, APU 140 provides the decrypted and decoded digital content back to MPU 110 or a graphics card for further processing.

In one embodiment, MPU 110 may request APC 120 to process multiple program threads. In this embodiment, APU 140 locks secure processing vault 130 and processes each thread in parallel (see FIG. 2B and corresponding text for further details).

In another embodiment, MPU 110 may request multiple APC's to process a single, computationally intensive thread. In this embodiment, each APC partially decodes the encrypted/encoded digital content, and encrypts the partially decoded digital content before sending it to another APC (see FIGS. 3, 6, and corresponding text for further details).

Figure 2A:
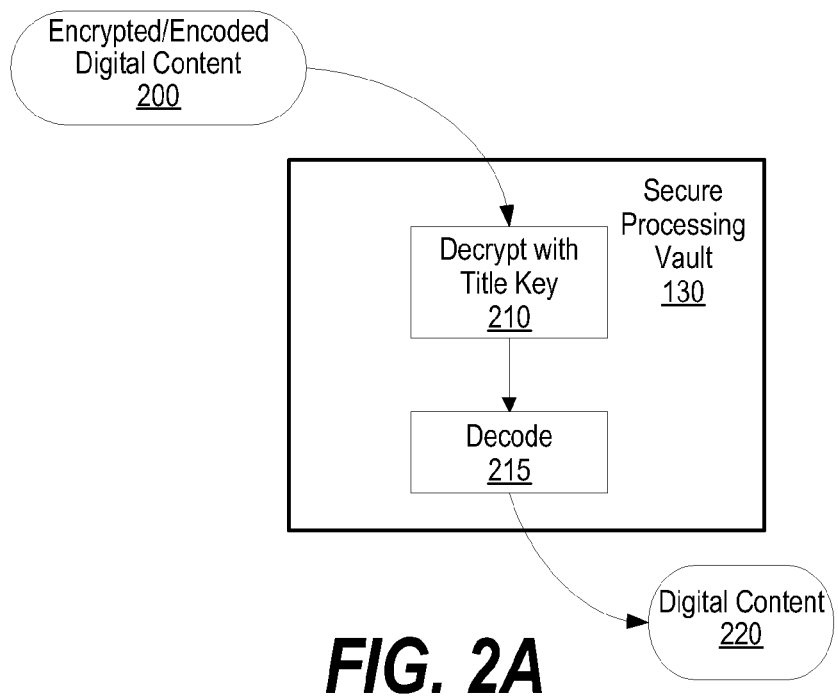
FIG. 2A is a diagram showing a secure processing vault decrypting and decoding a single encrypted/encoded digital content thread.

FIG. 2A is a diagram showing a secure processing vault decrypting and decoding a single encrypted/encoded digital content thread. Secure processing vault 130 is the same as that shown in FIG. 1, and includes an attached processing unit (APU 140) and a local storage area (local store 150).

Secure processing vault 130 calculates a title key from one or more device keys and, in turn decrypts encrypted/encoded digital content 200 using the title key (step 210). For example, the title key may be calculated using advanced access content standards (AACS) (see FIG. 5 and corresponding text for further details). Secure processing vault 130 decodes the decrypted encoded digital content at step 215, which results in decoded digital content 220.

The location between decrypting (step 210) and decoding (step 215) contains the most valuable digital content state, which is decrypted but not yet decoded digital content. As can be seen, this location is secured within secure processing vault 130 and, therefore, inaccessible to malicious clients.

Figure 2B:
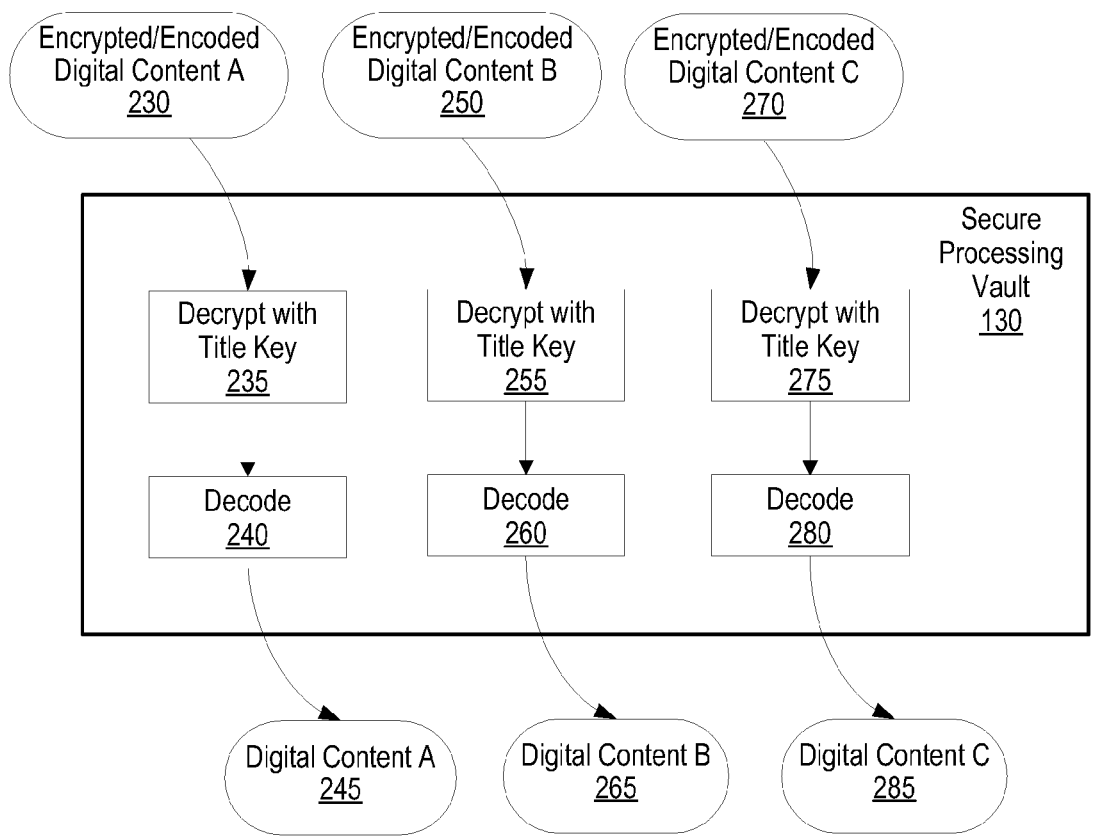
FIG. 2B is a diagram showing a secure processing vault decrypting and decoding a plurality of encrypted/encoded digital content threads.

FIG. 2B is a diagram showing a secure processing vault decrypting and decoding a plurality of encrypted/encoded digital content threads. When a main processing unit identifies multiple program threads that a single attached processing complex can process, the main processing unit may request a single attached processing complex to process each of the multiple program threads. As such, the APC's corresponding attached processing unit locks a secure processing vault to process the multiple threads.

SPV 130 calculates a title key and receives three encrypted/encoded digital content streams 230, 250, and 270. SPV 130 is the same as that shown in FIG. 1. As such, SPV 130 decrypts (steps 235, 255, and 275) and decodes (steps 240, 260, and 280) the three encrypted/encoded digital content streams in parallel, which produce decoded digital content A 245, decoded digital content B 265, and decoded digital content C 285.

Figure 3:
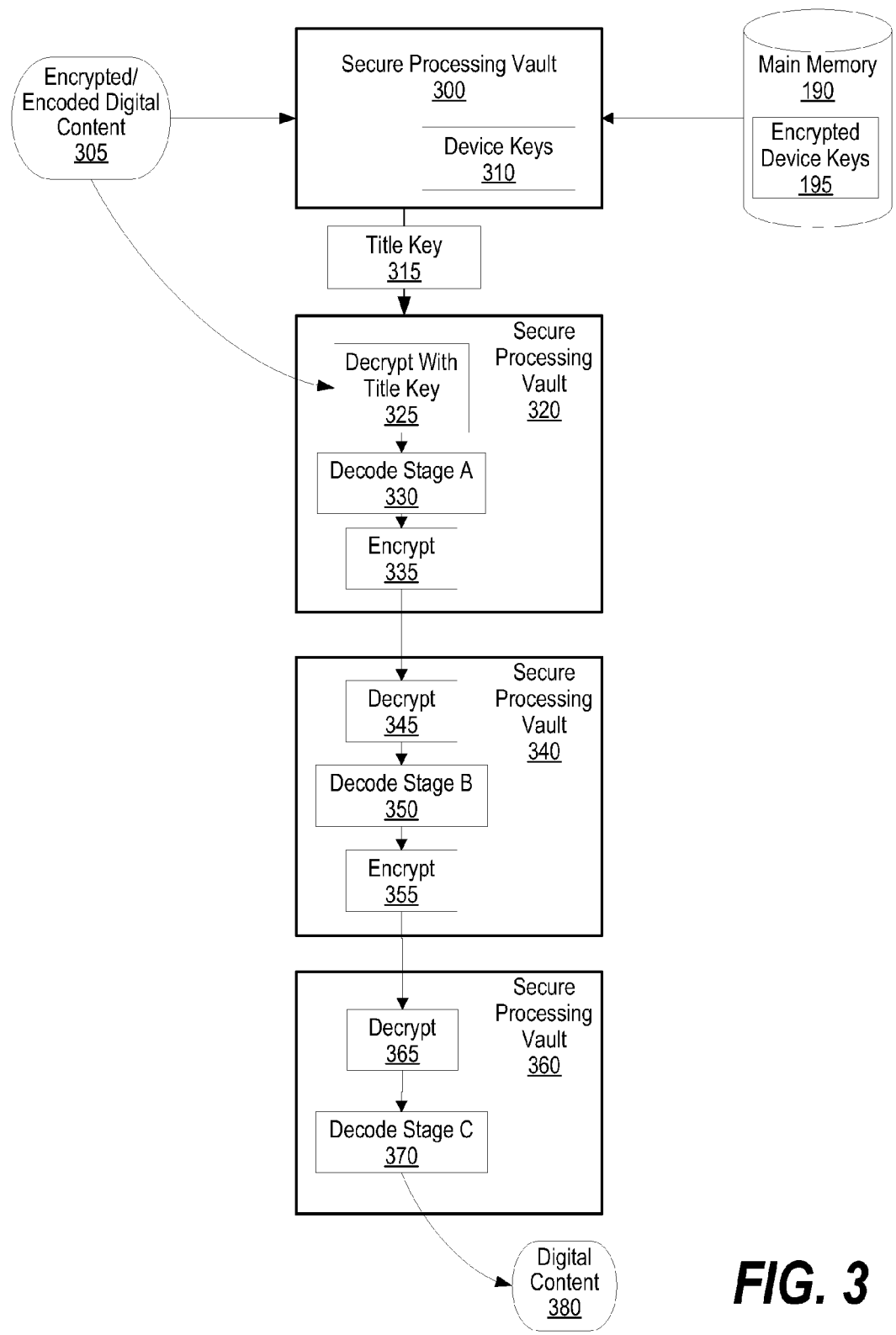
FIG. 3 is a diagram showing a plurality of secure processing vaults (SPVs) decrypting and decoding, in stages, an encrypted/encoded digital content thread.

FIG. 3 is a diagram showing a plurality of secure processing vaults (SPVs) decrypting and decoding, in stages, an encrypted/encoded digital content thread. When a main processing unit identifies a highly computational program thread, the main processing unit may require multiple SPVs to process the thread. As such, the SPVs sequentially process the program thread by partially decoding the encoded digital content and then encrypting the partially decoded digital content before sending it to another SPV.

Secure processing vault 300 retrieves encrypted device keys 195 from main memory 190 and decrypts encrypted device keys 195, which result in decrypted device keys 310. In turn, secure processing vault 300 calculates title key 315 using decrypted device keys 310 (see FIG. 5 and corresponding text for further details regarding title key calculation). In turn, secure processing vault 300 provides title key 315 to secure processing vault 320. Main memory 190 and encrypted device keys 195 are the same as that shown in FIG. 1.

Secure processing vault 320 uses title key 315 to decrypt encrypted/encoded digital content 305 (step 325), resulting in encoded digital content. In addition, secure processing vault 320 may partially decode the encoded digital content (step 330) using common techniques such as MPEG 4 (H.264). In order to secure the partially decoded digital content as it passes to a different secure processing vault for further decoding, secure processing vault 320 encrypts the partially decoded digital content (step 335) and sends the encrypted partially decoded digital content to secure processing vault 340, which comprises a different attached processing unit and a different local storage area.

Secure processing vault 340 decrypts (step 345) the encrypted partially decoded digital content, and continues the decoding process (step 350). Since secure processing vault 340 does not fully decode the digital content, secure processing vault 340 encrypts (step 355) the partially decoded digital content and sends the partially decoded digital content to secure processing vault 360, which comprises a different attached processing unit and a different local storage area.

Secure processing vault 360 decrypts (step 365) the encrypted partially decoded digital content, and proceeds to finish the decoding process (step 370). As a result, secure processing vault 360 provides decoded digital content 380, which is decrypted and decoded, to a main processing unit or a graphics card.

Figure 4:
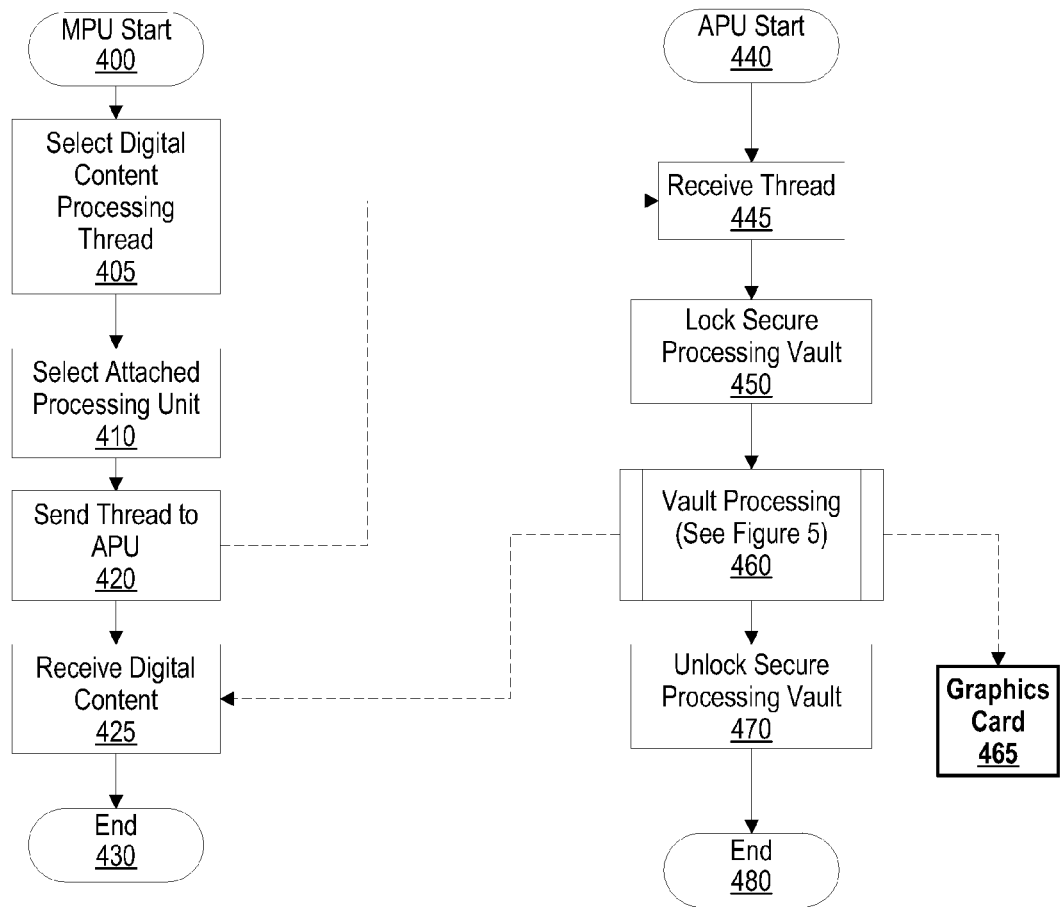
FIG. 4 is a high level flowchart showing steps taken in a main processing unit requesting an attached processing complex to decrypt and decode encrypted/encoded digital content.

FIG. 4 is a high level flowchart showing steps taken in a main processing unit requesting an attached processing complex to decrypt and decode encrypted/encoded digital content. A main processing unit (MPU), such as MPU 110 shown in FIG. 1, passes program threads corresponding to encrypted/encoded digital content to an attached processing unit (APU), such as APU 140 shown in FIG. 1. In turn, the APU decrypts and decodes the data within a secure processing vault, and passes decrypted and decoded digital content back to the main processing unit for further processing. For example, the digital content may be a digital video stream, in which case the main processing unit formats the digital video stream for viewing on a monitor. In another example, the digital content may be a digital audio stream, in which case the main processing unit formats the digital audio stream for playing on speakers.

MPU processing commences at 400, whereupon the MPU selects a program thread corresponding to encrypted/encoded digital content at step 405. At step 410, processing selects one or more attached processing units to process the program thread. For example, if the thread requires multiple APU's to process, such as the example shown in FIG. 3, the MPU selects multiple APU's to process the thread at step 410. The flowchart shown in FIG. 4 shows that the encrypted/encoded digital content requires one APU to process.

At step 420, the MPU sends the program thread to the selected APU. APU processing commences at 440, whereupon the APU receives the program thread at step 445. At step 450, the APU locks a secure processing vault, which comprises the APU and a local storage area, such as local store 150 shown in FIG. 1.

While the secure processing vault is locked, the APU and the local storage area are inaccessible to external sources, such as a malicious client. In addition, the APU accesses the local storage area using physical addresses (not translated addresses) so that the secure processing vault is not compromised when a malicious client attempts to alter address translation tables. As such, the secure processing vault (APU and local storage area) decrypts and decodes the encrypted/encoded digital content, and provides the decrypted and decoded digital content to the MPU or graphics card 465 (pre-defined process block 460, see FIG. 5 and corresponding text for further details).

Once the APU is finished processing the encrypted/encoded digital content thread, the APU unlocks the secure processing vault at step 470, and APU processing ends at 480. The MPU receives the decrypted and decoded digital content from the APU at step 425. When finished, MPU processing ends at 430.

Figure 5:
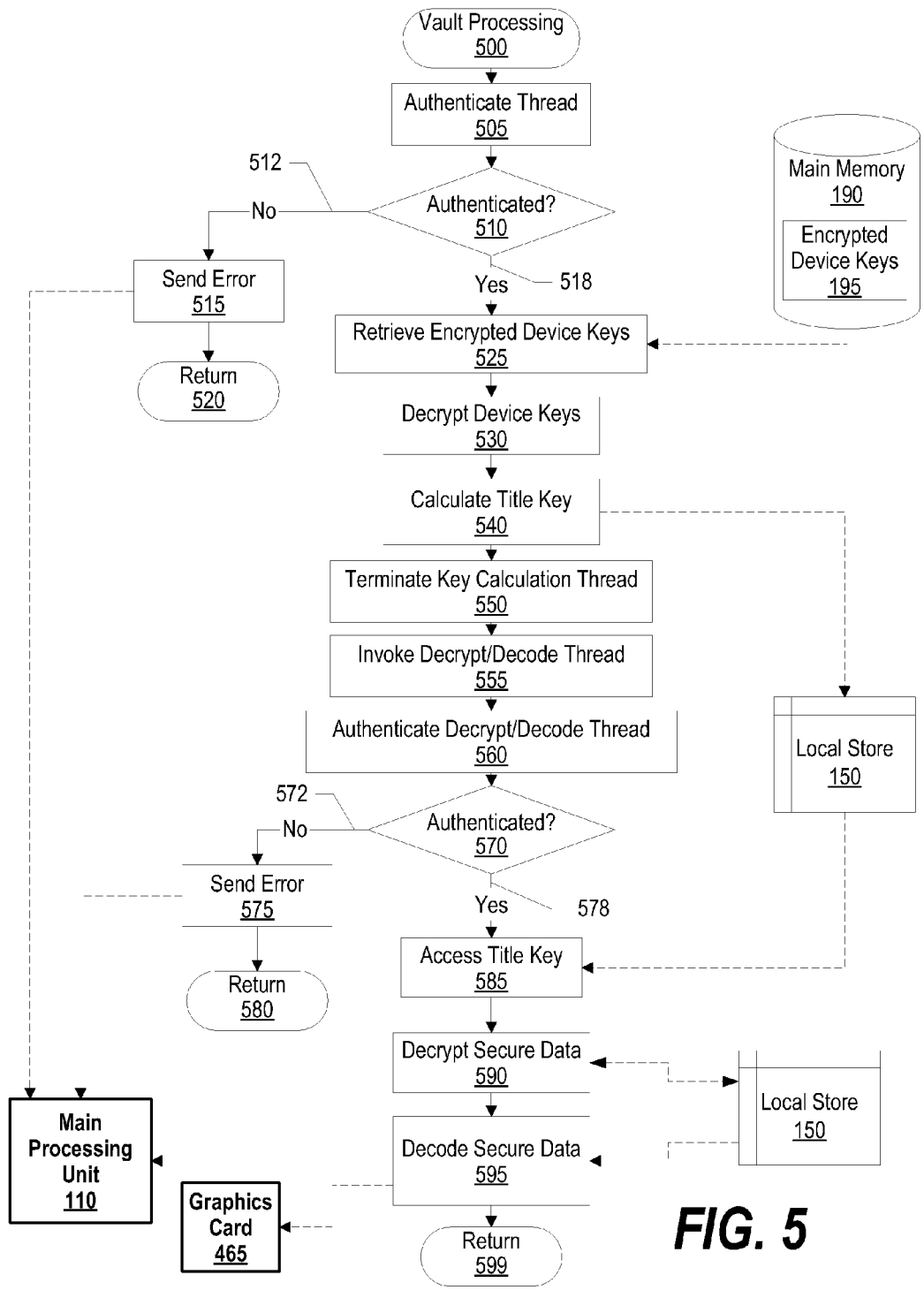
FIG. 5 is a flowchart showing steps taken in an attached processing unit (APU) and a local storage area functioning as a secure processing vault to decrypt and decode encrypted/encoded digital content.

FIG. 5 is a flowchart showing steps taken in an attached processing unit (APU) and a local storage area functioning as a secure processing vault to decrypt and decode encrypted/encoded digital content. The APU received a program thread from a main processing unit (MPU) that corresponds to encrypted/encoded digital content. As such, the APU "locked" the secure processing vault in order to decrypt and decode the encrypted/encoded digital content in a secure environment (see FIG. 4 and corresponding text for further details).

Secure processing vault (SPV) processing commences at 500, whereupon processing authenticates the program thread received from the MPU at step 505. For example, the authentication may include a run-time secure boot. In this example, the APU authenticates an isolated secure process during run-time operations, which provides the thread the ability to re-establish trust when an operating system is compromised.

A determination is made as to whether the program thread is authenticated (decision 510). If the program thread is not authenticated, decision 510 branches to "No" branch 512 whereupon the APU sends an error message to MPU 110 at step 515, and vault processing returns at 520. MPU 110 is the same as that shown in FIG. 1.

On the other hand, if the program thread authenticates, decision 510 branches to "Yes" branch 518 whereupon processing retrieves encrypted device keys 195 from main memory 190 at step 525. At step 530, processing decrypts encrypted device keys 195. Processing calculates a title key using the decrypted device keys, and stores the title key in local store 150, which is located within the secure processing vault and is the same as that shown in FIG. 1 (step 540). Main memory 190 and encrypted device keys 195 are the same as that shown in FIG. 1.

Storing the device key within the SPV's isolated local storage area (temp store 545) is critical because the isolated local storage area is not accessible by any other software processes including those with root privileges. Using the example described above, processing calculates a title key from the device keys based upon broadcast encryption technology. At step 550, processing terminates the program thread that calculated the title key and, at step 555, processing invokes a different thread to decrypt and decode the encrypted/encoded digital content. Processing invokes a new thread due to the fact that the title key calculation, which uses broadcast encryption technology, is functionally separate from decryption/decoding, which are video streaming applications.

Processing authenticates the decrypt/decode thread at step 560 to ensure that the thread, which resides in main memory, has not been tampered. A determination is made as to whether the decrypt/decode thread authenticates (decision 570). If the decrypt/decode thread does not authenticate, decision 570 branches to "No" branch 572 whereupon processing sends an error message to MPU 110 at step 575, and vault processing returns at 580.

On the other hand, if the decrypt/decode thread authenticates, decision 570 branches to "Yes" branch 578 whereupon the decrypt/decode thread accesses the title key that was previously stored in temporary store 545 (step 585). At step 590, the APU decrypts the encrypted/encoded digital content located in local store 150, which results in encoded digital content. The APU stores the encoded digital content in local store 150, which is within the secure processing vault and, therefore, not accessible to malicious clients.

Processing, at step 595, decodes the encoded digital content located in local store 150, and provides the decoded digital content to MPU 110 or graphics card 465. For example, processing may use a standard such as MPEG4 (H.264) to decode the encoded digital content. Graphics card 465 is the same as that shown in FIG. 4. Once the APU decodes and decrypts the encrypted/encoded digital content, secure processing vault processing returns at 599.

Figure 6:
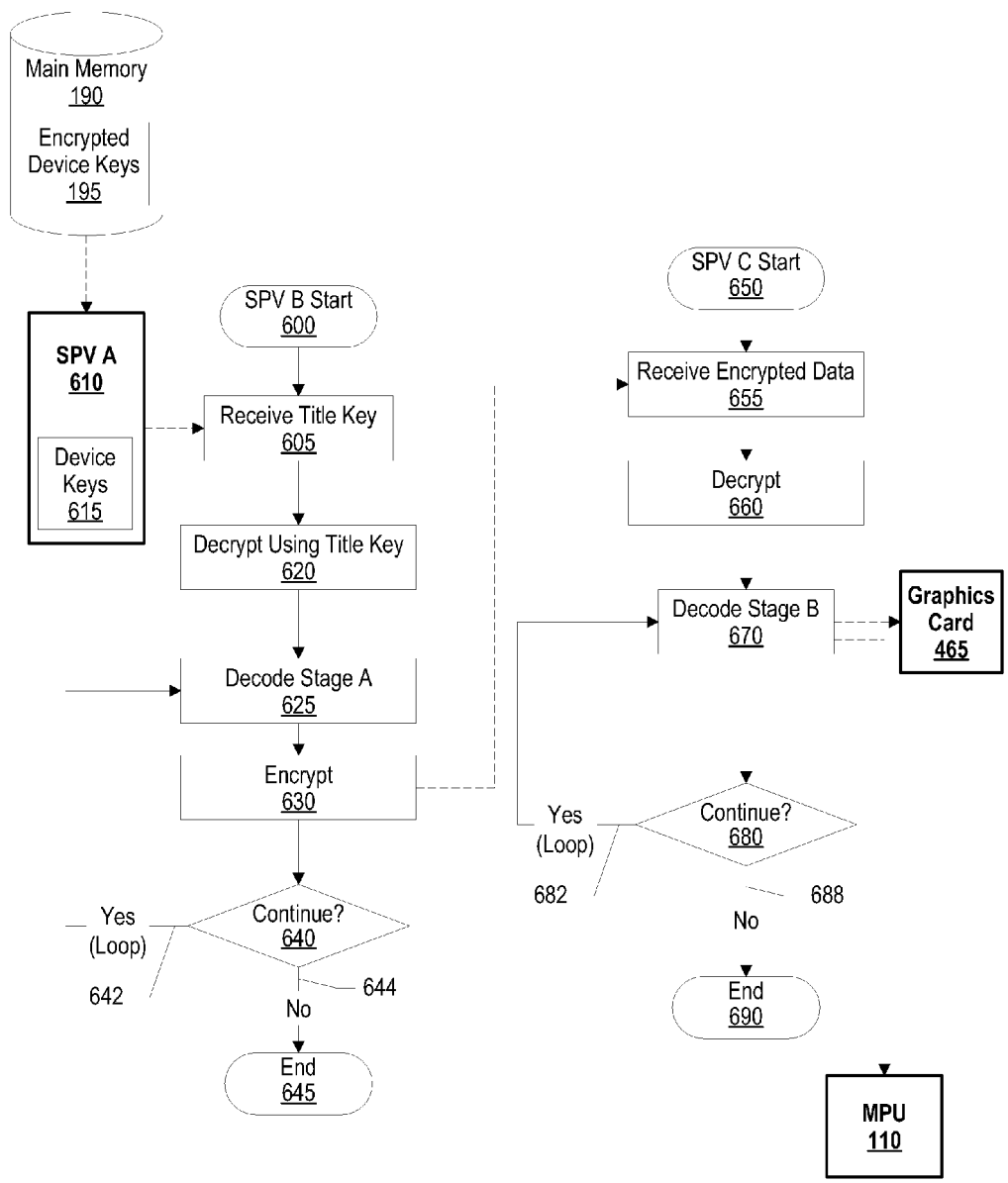
FIG. 6 is a flowchart showing steps taken in a plurality of secure processing vaults (SPVs) decrypting and decoding encrypted/encoded digital content.

FIG. 6 is a flowchart showing steps taken in a plurality of secure processing vaults (SPVs) decrypting and decoding encrypted/encoded digital content. A main processing unit (MPU) may request multiple attached processing complexes (APCs) to process a single, computationally intensive thread. In this embodiment, each attached processing unit (APU) within each APC locks its secure processing vault and proceeds to process the thread.

SPV A 610 retrieves encrypted device keys 195 from main memory 190 and decrypts encrypted device keys 195, resulting in decrypted device keys 615. SPV A 610 then calculates a title key based upon decrypted device keys 615 and passes the title key to SPV B. SPV B processing commences at 600, whereupon SPV B receives the title key from SPV A 610 at step 605. At step 620, processing decrypts encrypted/encoded digital content using the title key, resulting in encoded digital content.

Since the process of decoding the encoded digital content is computationally intensive, SPV B begins to partially decode the encoded digital content at step 625. During the decoding process, SPV B encrypts (step 630) the partially decoded digital content and begins passing the encrypted partially decoded digital content to SPV C. SPV B performs the encryption step in order to secure the partially decoded digital content as it is passed to SPV C.

SPV C processing commences at 650, whereupon processing begins receiving encrypted partially decoded digital content (step 655). At step 660, SPV C starts decrypting the encrypted partially decoded digital content, resulting in the partially decoded digital content. As such, SPV C begins the decoding process at step 670, and provides decoded digital content to MPU 110 or graphics card 465. MPU 110 is the same as that shown in FIG. 1 and graphics card 465 is the same as that shown in FIG. 4. As one skilled in the art can appreciate, more secure processing vaults may be used to decode digital content than what is shown in FIG. 6.

A determination is made as to whether SPV B is finished partially decoding and encrypting the encoded digital content (decision 640). If SPV B is not finished partially decoding and encrypting, decision 640 branches to "Yes" branch 642, which loops back and continues to partially decode and encrypt the encoded digital content. This looping continues until SPV B processing is finished, at which point decision 640 branches to "No" branch 644 whereupon SPV B processing ends at 645.

A determination is made as to whether SPV C has completed decoding all of the partially decoded digital content (decision 680). If SPV C is not finished decoding, decision 680 branches to "Yes" branch 682, which loops back and continues to decode the partially decoded digital content. This looping continues until SPV C processing is finished decoding, at which point decision 680 branches to "No" branch 688 whereupon SPV C processing ends at 690.

Figure 7:
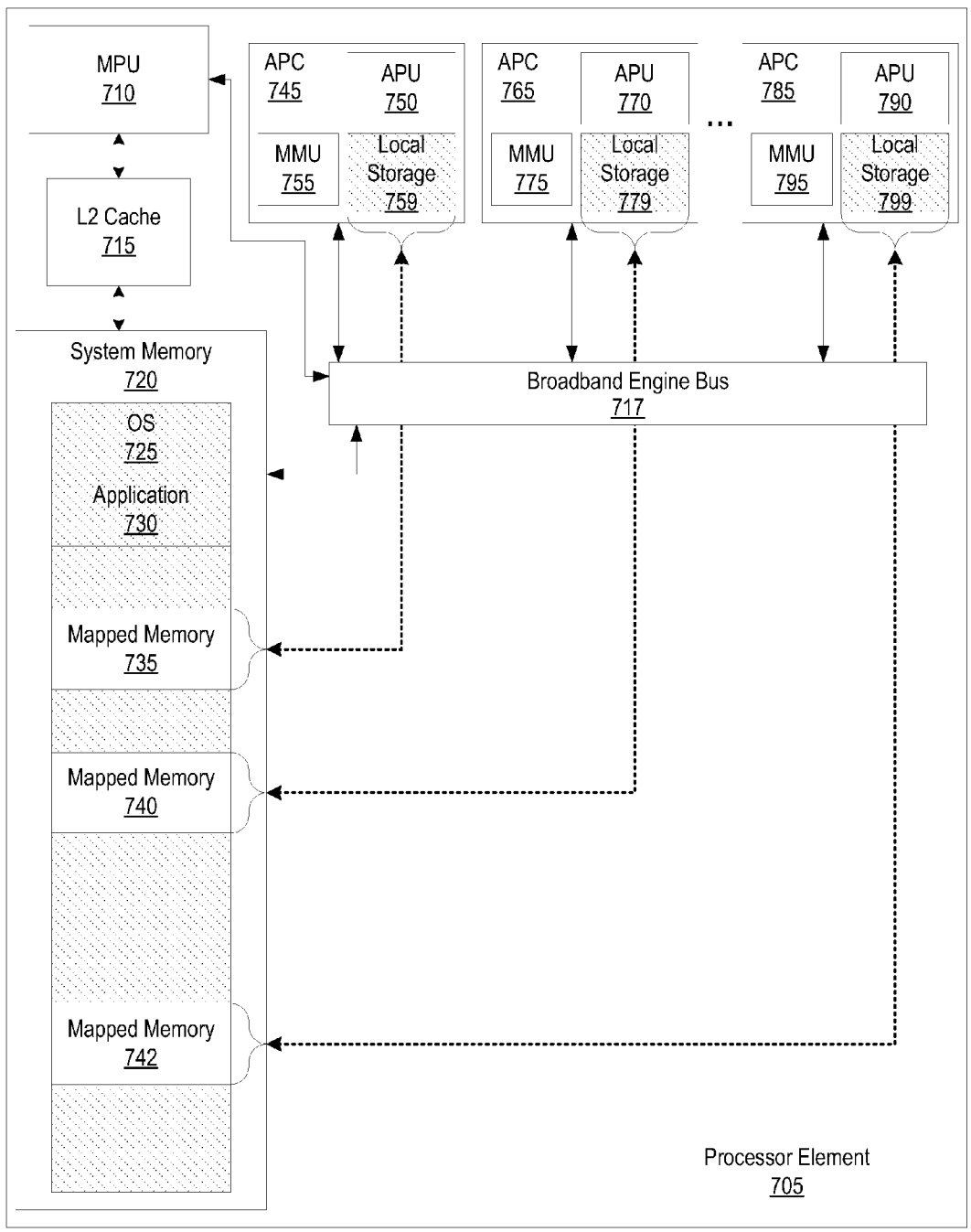
FIG. 7 is a block diagram of a computing device capable of implementing the present invention.

FIG. 7 is a block diagram illustrating a processing element having a main processor and a plurality of secondary processors sharing a system memory. FIG. 7 depicts a heterogeneous processing environment that can be used to implement the present invention. Primary Processor Element (PPE) 705 includes main processing unit (MPU) 710, which, in one embodiment, acts as the main processor and runs an operating system. MPU 710 may be, for example, a Power PC core executing a Linux operating system. PPE 705 also includes a plurality of attached processing complexes (APCs) such as APCs 745, 765, and 785. The APCs include attached processing units (APUs) that act as secondary processing units to PU 710, a memory storage unit, and local storage. For example, APC 745 includes APU 760, MMU 755, and local storage 759; APC 765 includes APU 770, MMU 775, and local storage 779; and APC 785 includes APU 790, MMU 795, and local storage 799.

All APCs may use the same ISA, or may each implement an application specific ISA. Each APC may be configured to perform a different task, and accordingly, in one embodiment, each APC may be accessed using different instruction sets. If PPE 705 is being used in a wireless communications system, for example, each APC may be responsible for separate processing tasks, such as modulation, chip rate processing, encoding, network interfacing, etc. In another embodiment, the APCs may have identical instruction sets and may be used in parallel with each other to perform operations benefiting from parallel processing.

PPE 705 may also include level 2 cache, such as L2 cache 715, for the use of MPU 710. In addition, PPE 705 includes system memory 720, which is shared between MPU 710 and the APUs. System memory 720 may store, for example, an image of the running operating system (which may include the kernel), device drivers, I/O configuration, etc., executing applications, as well as other data. System memory 720 includes the local storage units of one or more of the APCs, which are mapped to a region of system memory 720. For example, local storage 759 may be mapped to mapped region 735, local storage 779 may be mapped to mapped region 740, and local storage 799 may be mapped to mapped region 742. MPU 710 and the APCs communicate with each other and system memory 720 through bus 717 that is configured to pass data between these devices.

The MMUs are responsible for transferring data between an APU's local store and the system memory. In one embodiment, an MMU includes a direct memory access (DMA) controller configured to perform this function. MPU 710 may program the MMUs to control which memory regions are available to each of the MMUs. By changing the mapping available to each of the MMUs, the MPU may control which APU has access to which region of system memory 720. In this manner, the MPU may, for example, designate regions of the system memory as private for the exclusive use of a particular APU. In one embodiment, the APUs' local stores may be accessed by MPU 710 as well as by the other APUs using the memory map. In one embodiment, MPU 710 manages the memory map for the common system memory 720 for all the APUs. The memory map table may include MPU 710's L2 Cache 715, system memory 720, as well as the APUs' shared local stores.

In one embodiment, the APUs process data under the control of MPU 710. The APUs may be, for example, digital signal processing cores, microprocessor cores, micro controller cores, etc., or a combination of the above cores. Each one of the local stores is a storage area associated with a particular APU. In one embodiment, each SPU can configure its local store as a private storage area, a shared storage area, or an APU may configure its local store as a partly private and partly shared storage.

For example, if an APU requires a substantial amount of local memory, the APU may allocate 100% of its local store to private memory accessible only by that APU. If, on the other hand, an APU requires a minimal amount of local memory, the APU may allocate 10% of its local store to private memory and the remaining 90% to shared memory. The shared memory is accessible by MPU 710 and by the other APUs. An APU may reserve part of its local store in order for the APU to have fast, guaranteed memory access when performing tasks that require such fast access. The APU may also reserve some of its local store as private when processing sensitive data, as is the case, for example, when the APU is performing encryption/decryption.

While FIG. 7 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   receiving encrypted/encoded digital content within a secure processing vault;
   retrieving an encrypted device key from an external storage area into an isolated local storage area located within the secure processing vault;
   decrypting the encrypted device key within the secure processing vault, resulting in a decrypted device key;
   calculating, by a processor, a title key within the secure processing vault using the decrypted device key;
   decrypting the encrypted/encoded digital content within the secure processing vault using the title key, the decrypting resulting in encoded digital content that is isolated from any processes external to the secure processing vault;
   decoding the encoded digital content within the secure processing vault, the decoding resulting in decoded digital content; and
   providing the decoded digital content to one or more processes external the secure processing vault.

2. The method of claim 1 wherein the secure processing vault includes an attached processing unit and the isolated local storage area that are externally inaccessible when the secure processing vault is locked.

3. method of claim 2 further comprising:
   receiving a thread request from a main processing unit at the attached processing unit;
   in response to receiving the thread request, locking the secure processing vault prior to the decrypting and the decoding; and
   authenticating the received thread request subsequent to the locking of the secure processing vault.

4. The method of claim 3 further comprising:
   receiving a plurality of thread requests corresponding to a plurality of encrypted/encoded digital content from the main processing unit at the attached processing unit, the thread request included in the plurality of thread requests and the encrypted/encoded digital content included in the plurality of encrypted/encoded digital content; and
   in response to receiving the plurality of thread requests, performing the decrypting, the decoding, and the providing for each of the plurality of thread requests simultaneously within the secure processing vault.

5. The method of claim 3 wherein the main processing unit and the attached processing unit are located on separate processor cores.

6. The method of claim 5 wherein the separate processor cores are heterogeneous.

7. The method of claim 2 wherein the attached processing unit accesses the local storage area using physical address locations without the use of an address translation mechanism.

8. The method of claim 1 wherein the method includes a plurality of secure processing vaults, the secure processing vault included in the plurality of secure processing vaults, and wherein each of the plurality of secure processing vaults includes an attached processing unit and a local storage area, the decoding further comprising:
   partially decoding the encoded digital content at the secure processing vault, resulting in partially decoded digital content;
   encrypting the partially decoded digital content within the secure processing vault, resulting in encrypted partially decoded digital content;
   sending the encrypted partially decoded digital content to a different secure processing vault included in the plurality of secure processing vaults;
   decrypting, at the different secure processing vault, the encrypted partially decoded digital data, resulting in the partially decoded digital content; and further decoding the partially decoded digital content within the different secure processing vault, the further decoding resulting in the decoded digital content.

9. The method of claim 1 wherein the decoded digital content is selected from the group consisting of a digital video content stream and a digital audio content stream.

10. The method of claim 1 wherein the encrypted/encoded digital content is based upon a broadcast encryption technology.

11. The method of claim 1 wherein at least one of the processes is located on a device selected from the group consisting of a main processing unit and a graphics card.

12. An apparatus comprising:
one or more secure processing vaults that are each programmed to:
receive encrypted/encoded digital content;
retrieve an encrypted device key from an external storage area into an isolated local storage area located within the secure processing vault;
decrypt the encrypted device key within the secure processing vault, resulting in a decrypted device key;
calculate a title key within the secure processing vault using the decrypted device key;
decrypt the encrypted/encoded digital content using the title key, the decrypting resulting in encoded digital content that is isolated from any processes external to the secure processing vault;
decode the encoded digital content, the decoding resulting in decoded digital content; and
provide the decoded digital content to one or more processes external the secure processing vault.

13. The apparatus of claim 12 wherein the secure processing vault includes an attached processing unit and the isolated local storage area that are externally inaccessible when the secure processing vault is locked.

14. The apparatus of claim 13 wherein the secure processing vault is further programmed to:
receive a thread request from a main processing unit at the attached processing unit;
in response to receiving the thread request, lock the secure processing vault prior to the decrypting and the decoding; and
authenticate the received thread request subsequent to the locking of the secure processing vault.

15. The apparatus of claim 14 wherein the secure processing vault is further programmed to:
receive a plurality of thread requests corresponding to a plurality of encrypted/encoded digital content from the main processing unit at the attached processing unit, the thread request included in the plurality of thread requests and the encrypted/encoded digital content included in the plurality of encrypted/encoded digital content; and
in response to receiving the plurality of thread requests, perform the decrypting, the decoding, and the providing for each of the plurality of thread requests simultaneously within the secure processing vault.

16. The apparatus of claim 14 wherein the main processing unit and the attached processing unit are located on separate processor cores.

17. The apparatus of claim 16 wherein the separate processor cores are heterogeneous.

18. The apparatus of claim 13 wherein the attached processing unit accesses the local storage area using physical address locations without the use of an address translation mechanism.

19. The apparatus of claim 12 wherein the apparatus includes a plurality of secure processing vaults, the secure processing vault included in the plurality of secure processing vaults, and wherein each of the plurality of secure processing vaults includes an attached processing unit and a local storage area, the apparatus further programmed to:
partially decode the encoded digital content at the secure processing vault, resulting in partially decoded digital content;
encrypt the partially decoded digital content within the secure processing vault, resulting in encrypted partially decoded digital content;
send the encrypted partially decoded digital content to a different secure processing vault included in the plurality of secure processing vaults;
decrypt, at the different secure processing vault, the encrypted partially decoded digital data, resulting in the partially decoded digital content; and
further decode the partially decoded digital content within the different secure processing vault, the further decoding resulting in the decoded digital content.

20. The apparatus of claim 12 wherein the decoded digital content is selected from the group consisting of a digital video content stream and a digital audio content stream.

21. The apparatus of claim 12 wherein the encrypted/encoded digital content is based upon a broadcast encryption technology.

22. The apparatus of claim 12 wherein at least one of the processes is located on a device selected from the group consisting of a main processing unit and a graphics card.

23. An information handling system comprising:
a main processing device;
an attached processing device;
an isolated local storage area; and
a digital content processing tool for processing digital content, the digital content processing tool being programmed to:
receive encrypted/encoded digital content at a secure processing vault that includes the attached processing unit and the isolated local storage area;
retrieve an encrypted device key from an external storage area into the isolated local storage;
decrypt the encrypted device key within the secure processing vault, resulting in a decrypted device key;
calculate a title key within the secure processing vault using the decrypted device key;
decrypt the encrypted/encoded digital content using the title key within the secure processing vault, the decrypting resulting in encoded digital content that is isolated from any processes external to the secure processing vault;
decode the encoded digital content within the secure processing vault, the decoding resulting in decoded digital content; and
provide the decoded digital content to one or more processes external the secure processing vault.

24. The information handling system of claim 23 wherein the attached processing unit and the isolated local storage area are externally inaccessible when the secure processing vault is locked.

25. The information handling system of claim 24 wherein the digital content processing tool is further programmed to:
receive a thread request from the main processing unit at the attached processing unit;
in response to receiving the thread request, lock the secure processing vault prior to the decrypting and the decoding; and authenticate the received thread request subsequent to the locking of the secure processing vault.

26. The information handling system of claim 25 wherein the digital content processing tool is further programmed to:

receive a plurality of thread requests corresponding to a plurality of encrypted/encoded digital content from the main processing unit at the attached processing unit, the thread request included in the plurality of thread requests and the encrypted/encoded digital content included in the plurality of encrypted/encoded digital content; and in response to receiving the plurality of thread requests, perform the decrypting, the decoding, and the providing for each of the plurality of thread requests simultaneously within the secure processing vault.

27. The information handling system of claim 25 wherein the main processing unit and the attached processing unit are located on separate processor cores.

28. The information handling system of claim 27 wherein the separate processor cores are heterogeneous.

29. The information handling system of claim 24 wherein the attached processing unit accesses the local storage area using physical address locations without the use of an address translation mechanism.

30. The information handling system of claim 23 wherein the information handling system includes a plurality of secure processing vaults, the secure processing vault included in the plurality of secure processing vaults, the digital content processing tool further programmed to:

partially decode the encoded digital content at the secure processing vault, resulting in partially decoded digital content;

encrypt the partially decoded digital content within the secure processing vault, resulting in encrypted partially decoded digital content;

send the encrypted partially decoded digital content to a different secure processing vault included in the plurality of secure processing vaults;

decrypt, at the different secure processing vault, the encrypted partially decoded digital data, resulting in the partially decoded digital content; and further decode the partially decoded digital content within the different secure processing vault, the further decoding resulting in the decoded digital content.

31. The information handling system of claim 23 wherein the decoded digital content is selected from the group consisting of a digital video content stream and a digital audio content stream.

32. The information handling system of claim 23 wherein the encrypted/encoded digital content is based upon a broadcast encryption technology.

* * * * *